(12) United States Patent
Matera

(10) Patent No.: US 7,744,211 B2
(45) Date of Patent: Jun. 29, 2010

(54) EYEWEAR DEVICE, AND METHOD OF MAKING THE SAME, THAT REDUCES FOGGING

(76) Inventor: Pasquale Matera, 164 Floral Ave., Plainview, NY (US) 11803

( * ) Notice: Subject to any disclaimer, the term of this patent is extended or adjusted under 35 U.S.C. 154(b) by 0 days.

(21) Appl. No.: 11/979,423

(22) Filed: Nov. 2, 2007

(65) Prior Publication Data

US 2008/0129951 A1 Jun. 5, 2008

Related U.S. Application Data

(60) Provisional application No. 60/861,737, filed on Nov. 30, 2006.

(51) Int. Cl.
*G02C 11/08* (2006.01)
(52) U.S. Cl. ............................................. 351/62; 2/435
(58) Field of Classification Search .................... 351/62, 351/41, 158; 2/435, 436, 437
See application file for complete search history.

(56) References Cited

U.S. PATENT DOCUMENTS

| 163,648 | A | | 5/1875 | Gall |
| 3,015,987 | A | | 1/1962 | Harrison |
| 5,638,145 | A | | 6/1997 | Jannard et al. |
| 5,711,035 | A | | 1/1998 | Haslbeck |
| 5,969,787 | A | | 10/1999 | Hall et al. |
| 6,971,745 | B2 | * | 12/2005 | Sheldon ........................ 351/86 |
| 7,137,153 | B2 | * | 11/2006 | Hussey ........................... 2/437 |

* cited by examiner

*Primary Examiner*—Hung X Dang
(74) *Attorney, Agent, or Firm*—Kenealy Vaidya LLP

(57) ABSTRACT

An eyewear device includes a frame including an eyewire and a ledge, the eyewire at least partially encircling a lens and the at least one lens resting on the ledge, and a plurality of grooves in the ledge between the at least one lens and the frame, wherein the plurality of grooves are configured to allow air to circulate between opposite sides of the lens to reduce fogging. A method of producing an eyewear device includes providing a frame comprising an eyewire and a ledge, the eyewire at least partially encircling a lens and the at least one lens resting on the ledge, and providing a plurality of grooves in the ledge between the at least one lens and the frame, wherein the plurality of grooves are configured to allow air to circulate between opposite sides of the lens to reduce fogging.

14 Claims, 3 Drawing Sheets

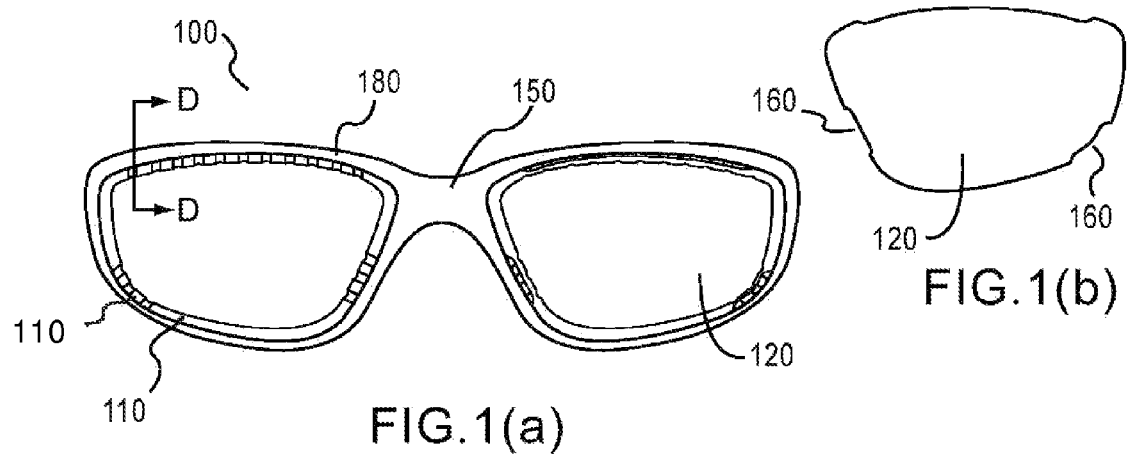
FIG.1(a)
FIG.1(b)
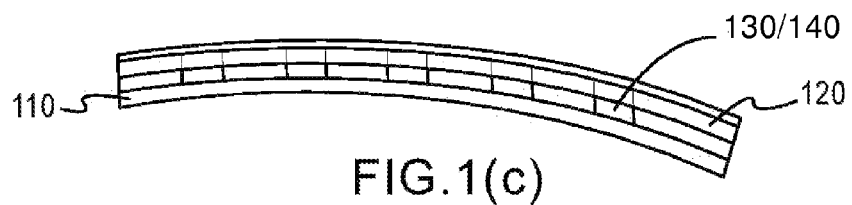
FIG.1(c)
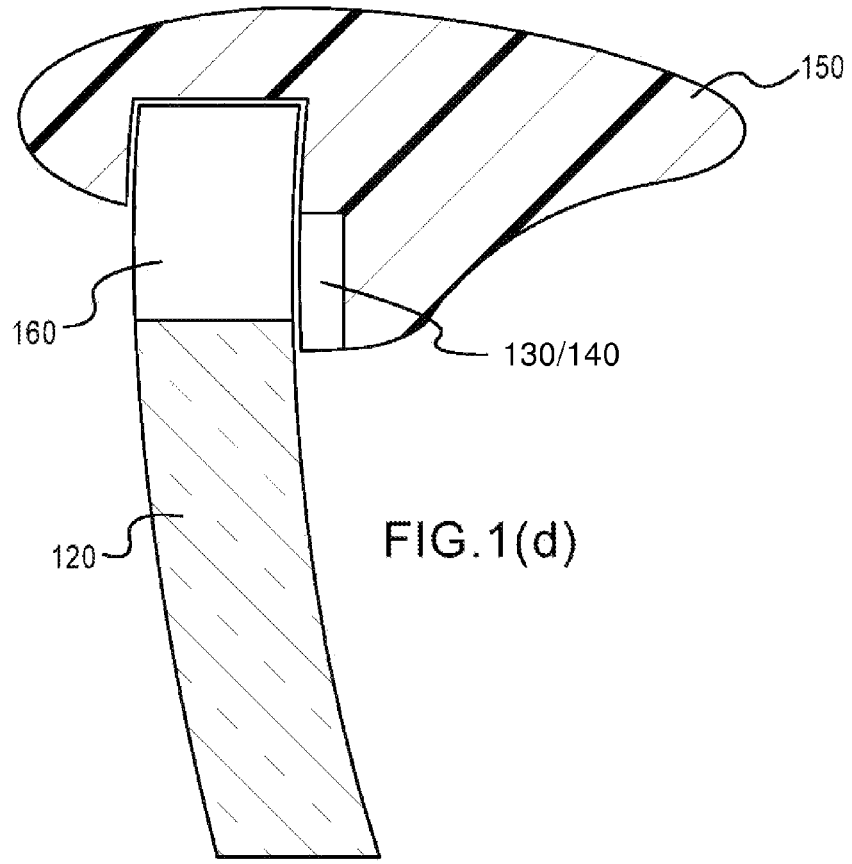
FIG.1(d)

EYEWEAR DEVICE, AND METHOD OF MAKING THE SAME, THAT REDUCES FOGGING

This application claims priority from U.S. Provisional Patent Application No. 60/861,737 entitled "Eyewear Device, and Method of Making the Same, That Reduces Fogging," filed Nov. 30, 2006. This application is incorporated by reference herein in its entirety.

BACKGROUND OF THE INVENTION

1. Field of the Invention

The present invention is related to a fog reducing system for glasses and goggles. More specifically, the present invention is directed to a fog reducing system for glasses and goggles and a method of making the same.

2. Description of the Related Art

Currently, glasses are available which are promoted as having fog reducing properties. Usually, such glasses include a series of apertures or holes in or about the lens and or frame front or temples. For example, Lin (U.S. Pat. No. 6,758,235) teaches a pair of fog-free protective glasses with a frame and a lens, wherein the frame has an embedded portion and a pair of temples pivotally connected to two ends of the embedded portion.

Also, Dawson et al. (U.S. Pat. No. 5,018,223) teach non-fogging goggles that include a double lens having a pair of two spaced-apart lenses with an air interstice therebetween and in which the inner surface of the outer lens is coated with a metal film.

In addition to improved or clear vision, conventional glasses provide a wearer with benefits under various conditions. However, such glasses easily fog over, especially when a wearer perspires. Fogging is inconvenient, uncomfortable and may even be dangerous for the wearer. Contact lenses provide clear vision without fog-prone lenses, but cannot provide a windbreak or sunscreen effect like glasses. There is presently, and there has always been, a consistent problem regarding the fogging of lenses of eyeglasses.

The above-described exemplary techniques using designs with holes in the lens have several drawbacks, such as allowing peripheral light and debris to reach the eye. Alternatively, sunglasses promoted as having designs which are vented with "holes" at the outer corners of the frame or temples display another shortcoming in that these designs do not allow enough air to be vented through the holes as to be useful or effective. Therefore, there is a need for sunglasses, glasses or goggles having a practical fog reducing system.

SUMMARY OF THE INVENTION

The present invention has been attained in view of the problems and shortcomings of the conventional techniques described above, wherein various exemplary embodiments of the inventive systems and methods provide fog-free protective glasses, and particularly glasses having an airflow function for heat convection and preventing fog from condensing on lenses thereof.

According to various exemplary embodiments and systems of the present invention, an eyewear device is provided that includes a frame having an eyewire and a ledge, the eyewire at least partially encircling at least one lens and the at least one lens resting on the ledge, and a plurality of grooves in the ledge between the at least one lens and the frame, wherein the plurality of grooves are configured to allow enough air to circulate between opposite sides of the at least one lens, wherein fogging is to reduced.

According to various exemplary embodiments and systems, a method of producing an eyewear device is provided that includes providing a frame having an eyewire and a ledge, the eyewire at least partially encircling at least one lens and the at least one lens resting on the ledge, and providing a plurality of grooves in the ledge between the at least one lens and the frame, wherein the plurality of grooves are configured to allow enough air to circulate between opposite sides of the at least one lens to reduce fogging.

BRIEF DESCRIPTION OF THE DRAWINGS

Various exemplary embodiments of the systems and methods will be described in detail, with reference to the following figures, wherein:

FIG. 1(a) is a front perspective view of a fog reducing eyewear device according to an exemplary embodiment, FIG. 1(b) is a front perspective view of the lens of FIG. 1(a) showing the vents, FIG. 1(c) is a front partial view of a top portion of the eyewear device of FIG. 1(a) as viewed from below, and FIG. 1(d) is a cross sectional view taken along with the line D-D of FIG. 1(a);

DETAILED DESCRIPTION OF THE INVENTION

Figure 2A:
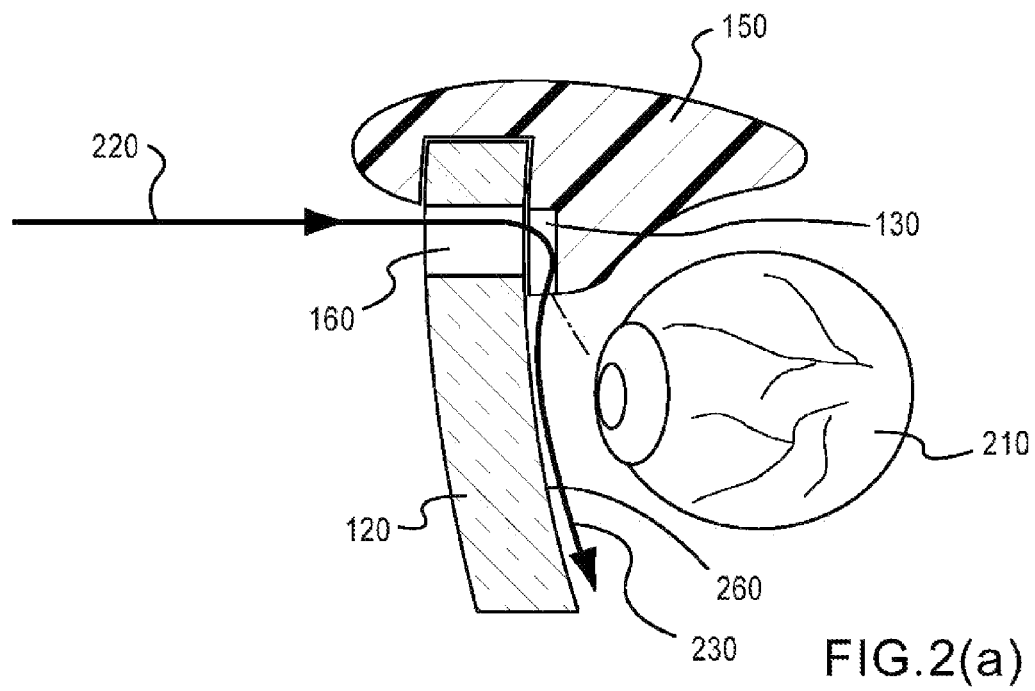
FIGS. 2(a)-(b) illustrate the exemplary embodiment illustrated in FIGS. 1(a)-(d) in operation.

These and other features and advantages of this invention are described in, or are apparent from, the following detailed description of various exemplary embodiments of the systems and methods.

FIGS. 1(a)-(d) illustrate a fog reducing eyewear device according to an exemplary embodiment of the present invention. In FIG. 1(a), the eyewear device 100 includes a frame 150 holding a lens 120, and the frame 150 includes an eyewire 180 that at least partially encircles the lens 120, and a ledge 110. The ledge 110 may include a plurality of grooves 140. The lens 120 may rest on the ledge 110, and the grooves 140 may be located between the ledge 110 and the lens 120. Also, the lens 120 may include a plurality of vents 160. The vents 160 and the grooves 140 may or may not be located in correspondence with respect to each other. In FIG. 1(d), the eyewear device 100 may also include an expansion chamber 130 inside the frame 150, wherein the expansion chamber 130 is located between the body of the frame 150 and a vent 160 of the lens 120. The ledge 110 may block peripheral light from penetrating an inside portion of the lens 120. The number and shape of the grooves 140 and the vents 160 allow for sufficient air mobility between an inside surface of the lens 120 and an outside surface of the lens 120 so that air can easily flow from one side of the lens 120 to the other. It should be noted that although FIGS. 1(a)-(d) illustrate the lens 120 as having a faintly oval shape, the lens 120 may have any and all shapes available in any current and future eyewear devices such as glasses or goggles.

The frame 150 may have an embedded portion and a pair of temples pivotally connecting to two ends of the embedded portion. The embedded portion may have upper and lower embedded plates to define a groove 140 therebetween, and two sides of the embedded portion are respectively formed with at least one guiding structure. Each guiding structure may have, for example, at least one drainage hole therein. The lens 120 may be embedded in the embedded groove 140 of the frame 150, and may respectively form a guiding portion. A leading airflow may thereby be provided from the guiding portion through the drainage hole for reducing fog formation on the lens 120. The ledge 110 may also have a series of channels at the surface of the ledge 110 instead of the grooves 140. It should also be noted that although the vents 160 and grooves 140 are illustrated in FIG. 1(c) as being of quasi-rectangular shape, the vents 160 and grooves 140 may have any shape that would allow an easy flow of air between both sides of the lens 120. Any such shapes include rectangular, square, triangular, trapezoidal, or any other shape that may be implemented in any eyewear device.

Figure 2B:
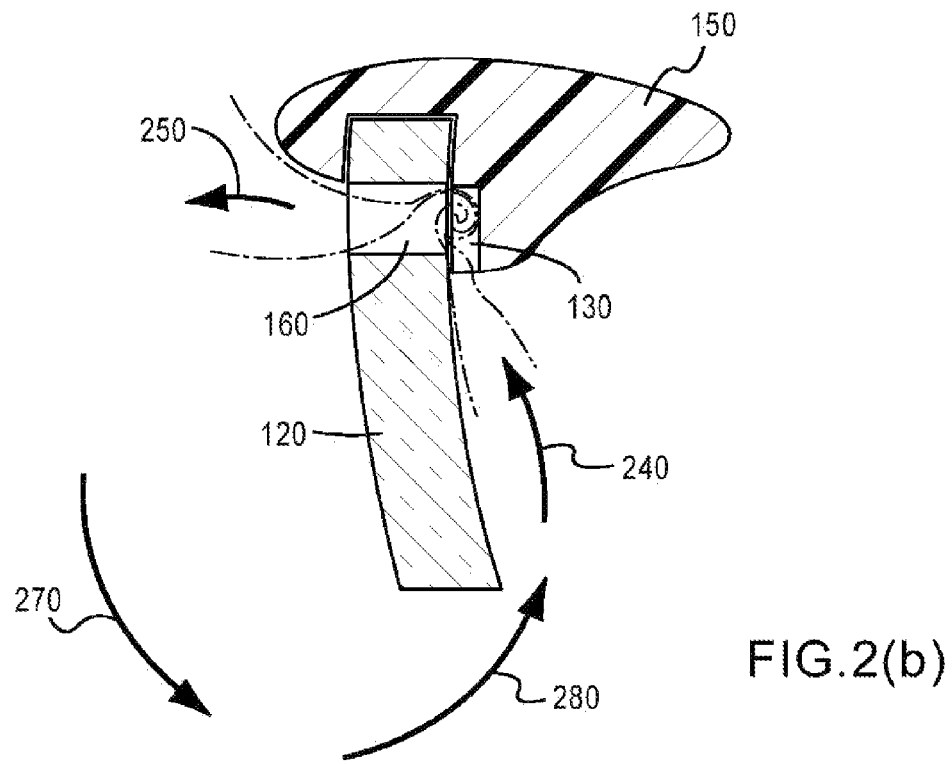

FIGS. 2(a)-(b) illustrate the exemplary embodiment illustrated in FIGS. 1(a)-(d) in operation. In operation, as illustrated in FIG. 2(a), the air may circulate between the outside of the lens 120 towards the inside of the lens 120, in a direction illustrated by flows 220 to 230. For example, such an air flow may take place if the wearer, represented by the eye 210, is in motion. In this case, the lens 120 may be shaped to allow a maximum amount of air in from the front of the frame 150 through the vents 160 in the lens 120. Accordingly, air may enter inside the frame 150 through the vents 160 or the grooves 140 and may be directed inside the frame 150, between the lens 120 and the wearer 210. Thus, air may circulate over the inner surface 260 of the lens 120, thereby reducing fogging. This is called "active" venting, wherein air is forced into the vents 160 or the grooves 140 because of external air pressure, wind, or movement of the wearer 210. Air volume tends to move from outside of the lens 120, with high volume and low pressure, to inside of the lens 120, with high pressure and low volume. This gradient in pressure is due to the outside air being forced into the vents 160, where it is compressed and funneled into a smaller area, on the inner side of the lens 120 and the expansion chamber 130, thus increasing the air pressure and speed. When the air is channeled into the inside surface 260 of the lens 120, a fog reducing effect is created. It should be noted that the expansion chamber 130 may be located in direct correspondence to, or opposite of, the vents 160 in order to allow an easier flow of air between the inner side 260 of the lens 120 and the outer side of the lens 120 and enhance the fog reduction of the lens 120. Thus, the wearer 210 does not have to regularly pull the lens 120 from his face in order to remove fogging because fogging is prevented from occurring in the first place.

Alternatively, as illustrated in FIG. 2(b), the air may circulate from the inner side surface 260 of the lens 120 to the outer side surface of the lens 120, as illustrated by the flow 240 to 250. This is called "passive" fog reduction by means of convection. When the air within the space between the wearer 210 and the inner side surface 260 of the lens 120 is heated by, for example, body temperature, the heated air tends to rise upwards, and escapes through the vents 160, as illustrated by the flow 240 to 250. The upward movement of warm air draws cooler air in from the outside at the bottom of the frame, as illustrated by flow 270 to 280. Colder air may then fill the space left by the rising warm air. The new, cold air then heats up and rises and the cycle repeats itself, creating a circular motion and venting of air, thus producing a "passive" fog reducing effect.

Figure 3:
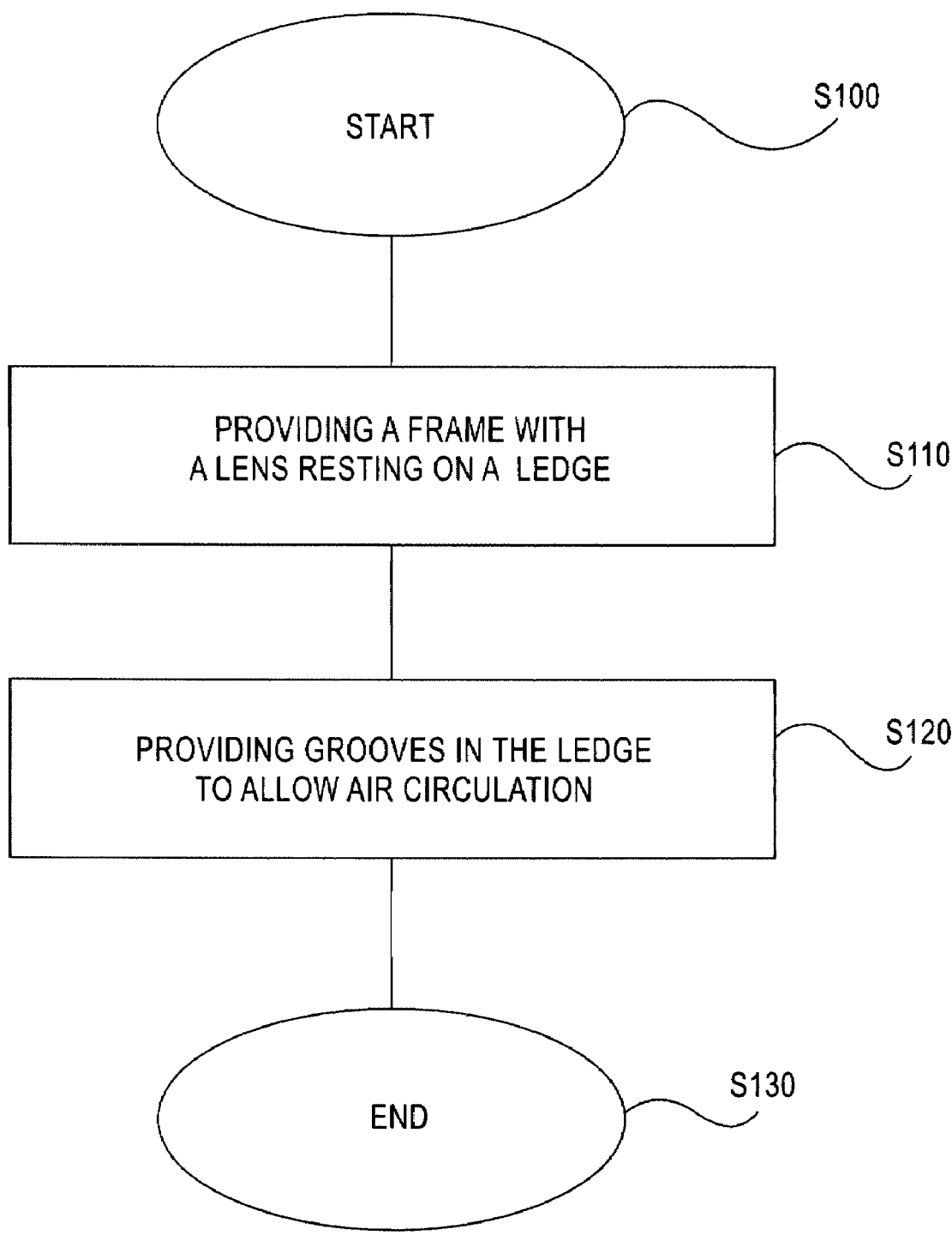
FIG. 3 is a flow diagram illustrating a method of producing a fog reducing eyewear device.

FIG. 3 is a flow diagram illustrating a method of producing a fog reducing eyewear device. In FIG. 3, the method starts at step S100, and continues to step S110, where an eyewear frame is provided. The frame may include an eyewire and a ledge, and the eyewire encircles a lens. Alternatively, the eyewire may also be configured to encircle more than one lens. Furthermore, the one or more lenses encircled by the eyewire may be configured to rest on the ledge. Next, the method continues to step S120, where a plurality of grooves are provided in the ledge, between the lens and the frame. The grooves may be configured to let enough air circulate between an inner side of the lens and an outer side of the lens to allow fog reduction by achieving temperature uniformity across both sides of the lens. The lens itself may also include vents to let air circulate between an inner side and an outer side of the lens and achieve temperature uniformity, which will result in fog reduction. An expansion chamber may be provided on the inner side of the lens, such that the expansion chamber is in direct correspondence with the vents of the lens to allow an easy flow of air between the inner side and the outer side of the lens. Next, the method continues to step S130, where the method ends.

It should be noted that the above-described eyewear device may be conventional glasses or goggles, and that the glasses, goggles, or frames may be provided with two separate eyewires, for holding two separate lenses, or may be provided with one eyewire for holding one lens, and the lens or lenses may include more than one lens layer. Furthermore, the glasses, goggles, frames, or eyewire of the above embodiments may be formed of plastic, metal, one or more metallic substance, or any other suitable material.

While this disclosure has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

What is claimed is:

1. An eyewear device, comprising:
   at least one lens including an outer surface and an inner surface;
   a frame comprising
      an eyewire configured and dimensioned to receive the at least one lens,
      a ledge configured and dimensioned to contact the at least one lens when the eyewire receives the at least one lens, and
      a surface; and
   a plurality of non-linear grooves defined in the ledge between the at least one lens and the frame,
   wherein the plurality of grooves are configured to allow air to circulate between opposite sides of the at least one lens such that the circulating air strikes the surface in a first direction and the surface deflects the circulating air from the first direction to a second direction that is different from the first direction.

2. The eyewear device of claim 1, wherein the frame comprises an expansion chamber.

3. The eyewear device of claim 1, wherein the ledge blocks peripheral light and debris from entering the device.

4. The eyewear device of claim 1, wherein a shape and number of the grooves allows air to circulate between opposite sides of the at least one lens to reduce fogging.

5. The eyewear device of claim 1, wherein the frame comprises a plurality of channels.

6. The eyewear device of claim 1, wherein the surface of the frame defines a groove and extends adjacent to and substantially parallel with a rear surface of the lens.

7. The eyewear device of claim 1, wherein the outer surface of the lens is spaced from the inner surface of the lens by a perimeter surface, the lens also having a central viewing axis substantially normal to the outer surface and inner surface and located at a substantial center of the lens, and the frame includes a front surface and a rear surface, wherein the lens is located in the eyewire between the front surface and the rear surface, and the front surface extends along the outer surface of the lens towards the center of the lens and is spaced from the center of the lens by a first distance, and the rear surface extends towards the center of the lens along the inner surface of the lens and is spaced from the center of the lens by a second distance that is less than the first distance, the frame defining a first groove portion that acts as an airway and extends along the inner surface of the lens and is located between the inner surface of the lens and the frame, the frame defining a second groove portion that acts as an airway and is in communication with the first groove portion, the second groove portion located between the perimeter surface of the lens and the frame, and the second groove portion defined by a surface of the frame that is substantially normal to a surface of the frame defining the first groove portion such that air is caused to deflect and turn within the airway.

8. An eyewear device, comprising:

at least one lens; and a frame comprising an eyewire receiving the at least one lens, the frame including a ledge configured and dimensioned to receive the at least one lens;

wherein the at least one lens comprises a plurality of vents to allow air to flow between opposite sides of the at least one lens, and the vents are defined by an outermost peripheral edge of the lens, the vents in the lens extend from the outermost peripheral edge towards a central area of the lens, and the frame includes a front surface located in front of the lens and which extends downward, and the frame includes a rear surface that also extends downward such that the lens is located between the front surface and rear surface of the frame, the rear surface extending further towards and being located closer to the central area of the lens than is the front surface.

9. The device of claim 8, wherein the frame comprises an expansion chamber in direct correspondence to the plurality of vents to allow air to flow between opposite sides of the at least one lens.

10. The eyewear device of claim 8, wherein the rear surface of the frame extends substantially parallel with and is alternatively spaced from and in contact with the inner surface of the lens to define a plurality of grooves in the frame.

11. The eyewear device of claim 10, wherein the portions of the rear surface of the frame that are spaced from the inner surface of the lens are spaced in a direction substantially normal to the inner surface of the lens.

12. A method of using an eyewear device, comprising:

providing at least one lens with an outer surface and an inner surface;

providing a frame comprising an eyewire configured and dimensioned to receive the at least one lens, a ledge configured and dimensioned to contact the at least one lens when the eyewire receives the at least one lens, and a groove surface located behind the inner surface of the lens such that the groove surface is located closer to a user when the eyewear device is worn properly by a user;

providing a plurality of grooves in the ledge between the at least one lens and the frame, each of the grooves including a respective groove surface;

wherein the eyewire at least partially encircles the at least one lens and the at least one lens rests on the ledge; and allowing air to circulate between opposite sides of the at least one lens by circulating air such that the air strikes the groove surface in the frame located behind the inner surface of the lens in a first direction, and by deflecting the circulating air from the first direction to a second direction that is different from the first direction using the groove surface located behind the inner surface of the lens to reduce fogging.

13. The method of claim 12, further comprising providing a plurality of vents in the lens to allow air to circulate between the inner surface and the outer surface of the at least one lens.

14. The method of claim 12, further comprising providing an expansion chamber inside the frame, wherein the expansion chamber is located between the frame and the inner surface of the lens.

* * * * *